United States Patent [19]
Lee et al.

[11] Patent Number: 5,828,884
[45] Date of Patent: Oct. 27, 1998

[54] METHOD FOR COMPILING A SOFTWARE PROGRAM AND EXECUTING ON A SYSTEM WHICH CONVERTS DATA BETWEEN DIFFERENT ENDIAN FORMATS

[75] Inventors: Sherman Lee, Rancho Palos Verdes, Calif.; JoAnne K. Halligan, Austin, Tex.

[73] Assignee: Advanced Micro Devices, Inc., Austin, Tex.

[21] Appl. No.: 652,786

[22] Filed: May 23, 1996

[51] Int. Cl.⁶ ............................... G06F 7/00; G06F 9/30
[52] U.S. Cl. .................... 395/705; 395/710; 395/898; 395/380; 395/376; 395/307; 395/500
[58] Field of Search ..................... 395/705, 702, 395/707, 710, 500, 380, 307, 311, 376, 377, 898, 800.33, 800.43; 711/201, 154, 167

[56] References Cited

U.S. PATENT DOCUMENTS

| | | | |
|---|---|---|---|
| 5,265,237 | 11/1993 | Tobias et al. | |
| 5,313,231 | 5/1994 | Yin et al. | |
| 5,408,664 | 4/1995 | Zarrin et al. | 395/652 |
| 5,423,010 | 6/1995 | Mizukami | |
| 5,524,256 | 6/1996 | Turkowski | 395/898 |
| 5,574,923 | 11/1996 | Heeb et al. | 395/800.38 |
| 5,594,919 | 1/1997 | Turkowski | 395/898 |
| 5,627,975 | 5/1997 | Bryant et al. | 395/307 |
| 5,630,084 | 5/1997 | Ikumi | 395/376 |
| 5,687,337 | 11/1997 | Carnevale et al. | 395/380 |

*Primary Examiner*—Emanuel Todd Voeltz
*Assistant Examiner*—Tuan Q. Dam
*Attorney, Agent, or Firm*—Conley, Rose & Tayon; B. Noel Kivlin

[57] ABSTRACT

A method for compiling a software program and executing the program on a data processing system which performs conversion between data formatted in differing endian formats, namely big-endian and little-endian formats, also known as byte swapping. The data processing system comprises a data storage device, such as system memory, a processor, and a byte swapping device coupled between the data storage device and the processor. Data conversion apertures, or ranges, are defined in the processor address space and the processor provides address signals to the byte swapping device. The byte swapping device selectively byte swaps data transferred between the processor and storage device based upon the relationship between the addresses received by the byte swapping device and the data conversion apertures. A compiler generates object offsets to data elements in a source code module, then adds a format base to the object offset to calculate a data aperture offset for each data element, which is then stored in an object code module. The format bases for the data elements are chosen according to the data type of the data element. A base memory address is bound to each data element at runtime, load-time or compile time. The base memory address for each data element is added to the data aperture offset for the data element to calculate a data aperture address for the data element. As the processor executes the program and performs a transfer of a data element between the processor and data storage device, the processor provides the data aperture address of the data element to the byte swapping device. The byte swapping device selectively byte swaps the data element during the transfer according to a relationship between the data aperture address and the data conversion apertures. The compiler generates data conversion aperture values and the processor programs the data conversion aperture values into aperture storage elements in the byte swapping device when loading the program into system memory for execution. The data conversion apertures are chosen based upon the set of data types comprised by the data elements, namely data types which require byte swapping and data types which do not.

14 Claims, 8 Drawing Sheets int x = 0x12345678;

| Address | Data | |
|---|---|---|
| 0x00000000 | 0x12 | |
| 0x00000001 | 0x34 | Big-Endian |
| 0x00000002 | 0x56 | |
| 0x00000003 | 0x78 | |

| | | |
|---|---|---|
| 0x00000000 | 0x78 | |
| 0x00000001 | 0x56 | Little-Endian |
| 0x00000002 | 0x34 | |
| 0x00000003 | 0x12 | | short y = 0x1234;

| | | |
|---|---|---|
| 0x00000000 | 0x12 | Big-Endian |
| 0x00000001 | 0x34 | |

| | | |
|---|---|---|
| 0x00000000 | 0x34 | Little-Endian |
| 0x00000001 | 0x12 | |

FIG. 3 char s[6] = "hello";

| Address | Data |
|---|---|
| 0x00000000 | 'h' |
| 0x00000001 | 'e' |
| 0x00000002 | 'l' |
| 0x00000003 | 'l' |
| 0x00000004 | 'o' |
| 0x00000005 | 0 |

FIG. 4

METHOD FOR COMPILING A SOFTWARE PROGRAM AND EXECUTING ON A SYSTEM WHICH CONVERTS DATA BETWEEN DIFFERENT ENDIAN FORMATS

FIELD OF THE INVENTION

The present invention relates generally to digital systems with data of different endian formats, and more particularly to the conversion between little-endian and big-endian formats.

DESCRIPTION OF THE RELATED ART

A typical data processing system includes among its components a central processing unit (CPU) coupled to a system memory by an address bus, a data bus and a control bus. The CPU has an associated address range which comprises the addresses which the CPU may supply on the address bus. This address range is also referred to as the address space of the CPU or system. The system memory typically occupies a portion of the address space of the system. Other devices, such as storage devices, display devices, or other input/output devices also occupy a portion of the address space. The system memory is arranged as a large array of cells, each cell having an associated memory address in the system address space. In most computers a cell is a byte, a byte being eight binary digits, thus each memory cell has an associated byte address.

The byte addresses of the system memory are ordered sequentially from zero through one less than the number of bytes in the memory. Bytes of data are grouped together into half-words, words, double-words, etc. A word is typically defined by the natural data width of the central processing unit (CPU) of the system. If a system has a CPU with a 32 bit wide data bus, for example, then a word may be defined to be 32 bits, arranged as 4 bytes with consecutive addresses. In this example, a half-word is a 16 bit quantity arranged as 2 bytes with consecutive addresses and a double-word is an 64 bit quantity arranged as 8 bytes with consecutive addresses.

FIG. 1 shows the layout of a typical system memory. Each rectangle represents a byte of memory. The address for each byte is shown. The figure shows a byte, half-word, word and double-word represented in the memory. These quantities are shown for a system in which a word is defined to be 4 bytes.

Programming languages introduce the notion of data elements as an abstraction of memory cells. That is, programming languages allow a means of associating bytes of storage with data elements. Data elements have associated attributes. One attribute of a data element is the data type, or type, of the data element. A defining characteristic of the data type is the size of the data type. One or more bytes of memory are allocated to contain the values of a given data element depending upon the data type of the data element. The contents, or values, of a data element may be assigned (written) or referenced (read) by using programming language statements. Typical primitive data elements include characters, integers, short integers, long integers, floating-point numbers, strings, pointers, labels, etc.

Additionally, programming languages commonly provide a means for user-definable data elements called data types or data structures. These data structures are defined as a collection of fields, where the fields comprise primitive data elements and other data structures (including recursive references to the data structure itself). Data structures are also commonly used as abstractions of the other devices, such as those mentioned previously, which occupy portions of the system address space. For example, a video display adapter coupled to the computer system may be abstracted as a data structure comprising combination of fields which represent registers and/or shared memory used to communicate with the adapter, where these hardware elements reside in the address space of and are thus accessible by the CPU.

Data elements in programs have associated memory addresses, that is the byte address of the first byte of the data element. The CPU and other devices in the system supply addresses of the data elements on the address bus in order to read/write the values of the data elements from/to the system memory via the data bus.

As previously discussed, data elements have an associated size, i.e., number of bytes allocated for the data element, based upon the data type of the data element. For example the C language provides an integer data type. In C, an integer data element is represented as the natural word size of the CPU. Hence, an integer on a 32 bit processor is four bytes. Thus, the word shown in FIG. 1 could be an integer. The bytes of a four byte word are commonly referred to as the most significant byte (MSB), middle most significant byte (MMSB), middle least significant byte (MLSB) and least significant byte (LSB).

Those who have designed computer systems have been posed with a decision concerning how to take a data element which consists of multiple bytes and order the constituent bytes in memory, that is, how to associate byte addresses with the bytes of a multiple-byte data element. In particular, designers have had to decide the order of the significant bytes of the data element in memory relative to addresses, the order commonly being referred to as byte ordering. Two prevalent formats have been chosen. These two formats are commonly referred to as "little-endian" and "big-endian" format.

Referring now to FIG. 2, a four byte integer is shown in both big-endian and little-endian format. In big-endian format the MSB is stored in the lowest of the memory addresses, the MMSB in the next greater memory address, the MLSB in the next greater memory address and the LSB in the next greater memory address. Conversely, in little-endian format the LSB is stored in the lowest of the memory addresses, the MLSB in the next greater memory address, the MMSB in the next greater memory address and the MSB in the next greater memory address.

Referring now to FIG. 3, a C language integer, x, is declared and initialized to have the hexadecimal value 0x12345678 and a short, y, is declared and initialized to have the hexadecimal value 0x1234. In this example, an integer is a four byte data element and a short is a two byte data element. The integer and short are shown stored in memory as both a big-endian and little-endian number.

Referring now to FIG. 4, a C language string, s, is declared and initialized to be the string "hello". In the C language, strings are conventionally null-terminated. The string is shown stored in memory. The storage of strings is the same for both big-endian and little-endian systems since each character of the string is a single byte, hence there are no byte ordering issues.

Data in a typical computer system is stored in other devices in addition to system memory. Examples of storage devices are permanent storage devices such as disk and tape drives. Additionally, data is stored in registers which exist on devices such as peripheral device controllers. Examples of peripheral device controllers are disk drive controllers, parallel ports, video display adapters, etc. Often these devices need to access data as well as the CPU. Further, the CPU is in communication with these devices and reads and writes data from and to these devices. Still further, the components may be connected by buses which transfer data. These buses also have an associated byte ordering. As long as the individual components of the system which process the data or transfer the data have the same byte ordering, no problems arise. However, if not all the components have the same byte ordering, then data formatting issues arise.

Let us consider an example in which the system CPU is a big-endian processor which submits commands to and receives status from a disk controller via shared data structures stored in system memory. The disk controller is a little-endian controller in that it is coupled to the system via a little-endian expansion bus, such as the Peripheral Component Interconnect (PCI) bus. The embedded processor of the disk controller is a little-endian processor. The CPU places command data structures in the system memory for the disk controller to retrieve and process. The disk controller requires that the command data structures which it retrieves from system memory be stored by the CPU in little-endian format in the system memory. Likewise, the disk controller places status data structures in system memory in little-endian format for the CPU to retrieve and process. The CPU must examine the status data structures with the knowledge that the status data structures are in little-endian format.

The traditional approach to solving problems of the nature identified by the example above has been for the programmer of the software involved, in this case the disk device driver, to painstakingly craft the device driver code to convert the data between different endian formats so as to have the correct byte ordering. This conversion is commonly referred to as "byte swapping", that is, the reversing of the order of the significant bytes of the data.

Typically, the programmer implementing code to perform byte swapping must include additional instructions, namely byte exchanges, shifts, rotates, masks, etc. when loading/storing data elements into/from CPU registers to achieve the byte swapping. This additional burden introduces at least three problems. First, the additional instructions are detrimental to the performance of the system. Second, the code is more bug prone and thus development time is increased. Third, the code developed is less portable.

Therefore, a system and method for converting data between little-endian and big-endian formats is desired which allows software developers to develop more efficient, portable, and bug-free code with respect to byte ordering issues.

SUMMARY OF THE INVENTION

The present invention comprises a method for compiling a software program and executing the program on a computer system which performs conversion between data formatted in differing endian formats, namely big-endian and little-endian formats, also known as byte swapping. The data processing system comprises a data storage device configured to store bytes of data, a processor which reads data from the data storage device and writes data to the data storage device, and a byte swapping device coupled between the data storage device and the processor. The byte swapping device selectively byte swaps data transferred between the processor and storage device. Data conversion apertures, or ranges, are defined in the processor address space and the processor provides address signals to the byte swapping device. The byte swapping device selectively byte swaps the data based upon the relationship between the addresses received by the byte swapping device and the data conversion apertures.

The compiler translates a source code module into an object code module using translation techniques well known in the art with the exception regarding the generation of offsets placed in the object module for data elements, such as integers, strings, data structures, etc., referenced by the source code module from which the software program is compiled. The compiler generates object offsets to the data elements as is typical, but then adds a format base to the object offset to calculate a data aperture offset for each data element, which is then stored in the object code module. The format bases for the data elements are chosen according to the data type of the data element.

A base memory address is bound to each data element by well know techniques, namely during run-time, load-time and compile time. The base memory address for each data element is added to the data aperture offset for the data element to calculate a data aperture address for the data element. As the processor executes the program and performs a transfer of a data element between the processor and data storage device, the processor provides the data aperture address of the data element to the byte swapping device. The byte swapping device selectively byte swaps the data element during the transfer according to a relationship between the data aperture address and the data conversion apertures.

The byte swapping device further comprises aperture storage elements configured to store the data conversion apertures. The compiler generates the data conversion aperture values and the processor programs the aperture storage elements with the values of the data conversion apertures when loading the program into memory for execution.

The data conversion apertures are chosen based upon the set of data types comprised by the data elements, namely data types which require byte swapping and data types which do not.

Thus, the present invention provides a method for software developers to develop code to execute on a system which performs byte swapping of data between little-endian and big-endian formats thus fostering the development of more efficient, portable, and bug-free code without undue entanglement with byte ordering issues.

BRIEF DESCRIPTION OF THE DRAWINGS

A better understanding of the present invention can be obtained when the following detailed description of the preferred embodiment is considered in conjunction with the following drawings, in which:

FIG. 3 shows the storage of a C language integer and short integer in a system memory in both big-endian format and little-endian format;

FIG. 4 shows the storage of a C language string in a system memory;

DETAILED DESCRIPTION OF THE PREFERRED EMBODIMENT

Incorporation by Reference

The following references are hereby incorporated by reference.

For general information on programming language concepts, please see Ghezzi and Jazayeri, *Programming Language Concepts*, John Wiley and Sons, Inc., 1982 which is hereby incorporated by reference in its entirety. For general information on code translation please see Aho and Ullman, *Principles of Compiler Design*, Addison-Wesley, 1979, which is hereby incorporated by reference in its entirety.

FIG. 5

Figure 1:
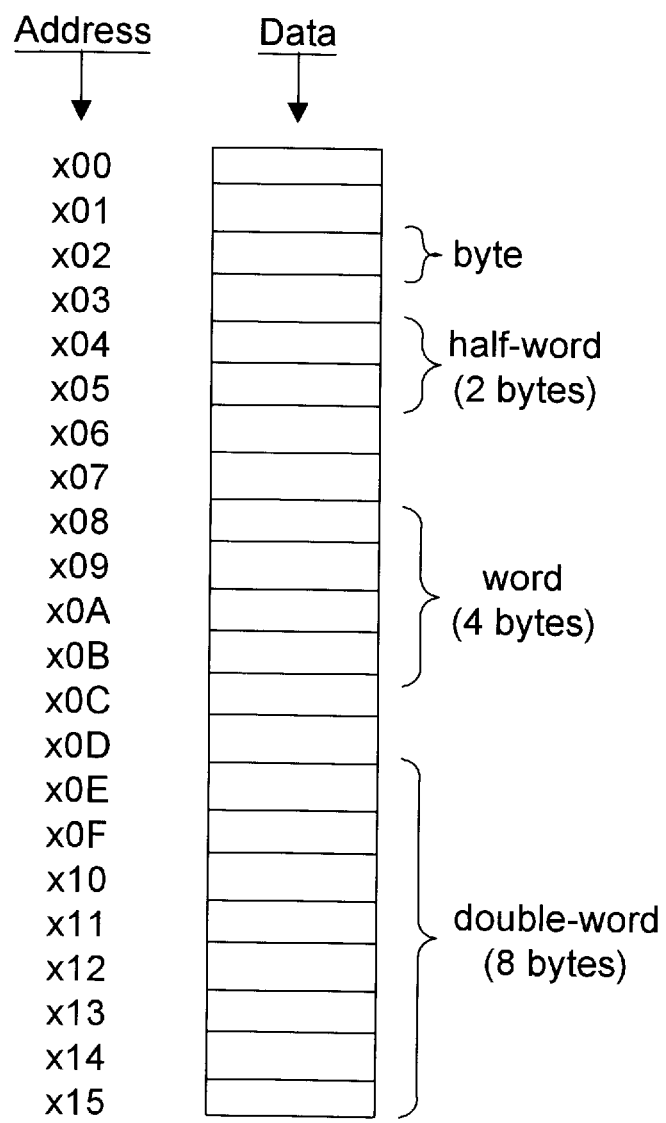
FIG. 1 shows the layout of a typical system memory and common memory entities.
Figure 2:
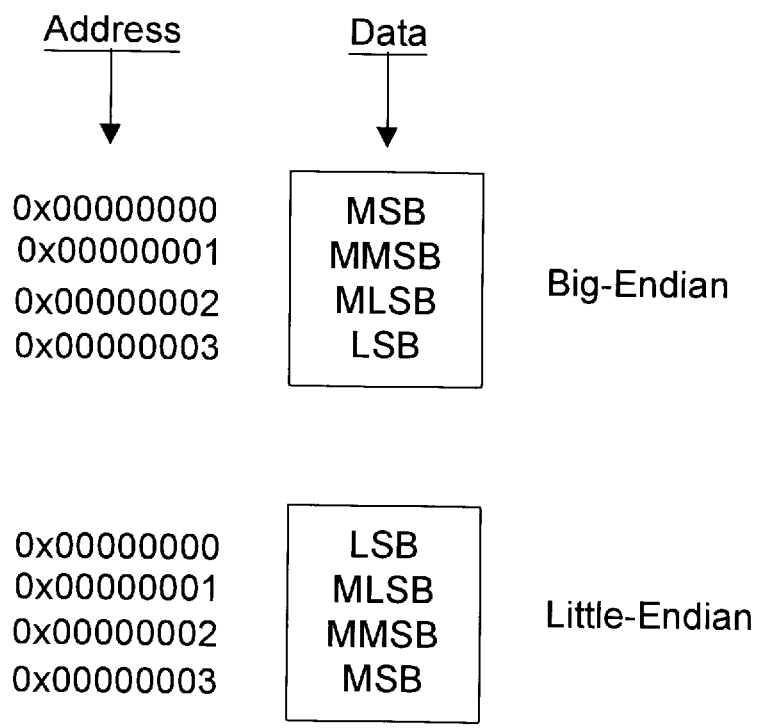
FIG. 2 shows the layout of significant bytes of a 4 byte word in both big-endian and little-endian format.
Figure 5:
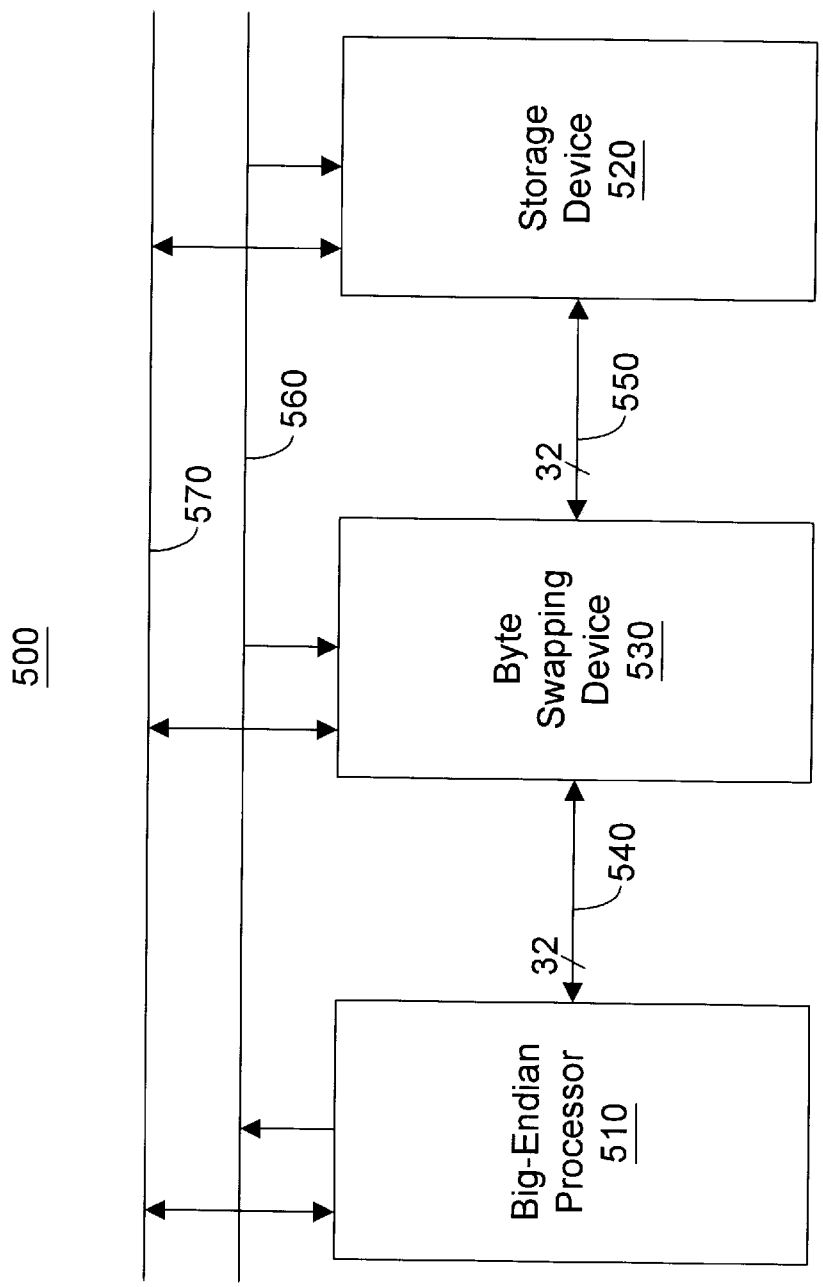
FIG. 5 shows components of a computer system employing a byte swapping device according to the preferred embodiment of the present invention.

Referring now to FIG. 5, a computer system 500 employing a byte swapping device according to the preferred embodiment of the present invention is shown. The system 500 comprises a big-endian format processor 510, a storage device 520 and a byte swapping device 530. The processor 510 is coupled to the byte swapping device 530 by a processor data bus 540. The storage device 520 is coupled to the byte swapping device 530 by a system data bus 550. The processor 510, storage device 520 and byte swapping device 530 are coupled to a processor address bus 560. The processor 510, the storage device 520 and the byte swapping device 530 are coupled to a control bus 570.

The storage device 520 is representative of a system memory, peripheral device, peripheral device controller, or other elements capable of storing multiple bytes of data. At least a portion of the data stored in the storage device 520 comprises data elements stored in little-endian format. Other storage devices (not shown) may be coupled to the system data bus 550 and the processor address bus 560. Signals representative of common computer system control bus signals are transmitted on the control bus 570. The control bus signals comprise a clock signal, a read/write signal, memory/IO signal, a code/data signal, byte enable signals, ready signal, data width signals, and an address strobe signal.

In the system 500 shown, the processor data bus 540 and system data bus 550 are 32 bits wide organized in four sets of eight bits, commonly referred to as byte lanes. However, it is noted that data buses of different widths are contemplated in the present invention and the invention is intended to extend to data buses of larger or smaller numbers of bits. The processor 510 reads data from the storage device 520 and writes data to the storage device 520.

As the processor 510 reads data from the storage device 520 the data passes from the storage device 520 along the system data bus 550 to the byte swapping device 530. The byte swapping device 530 receives the data from the system data bus 550 and selectively byte swaps the data. The byte swapping device 530 then provides the data to the processor 510 on the processor data bus 540. The processor 510 receives the data from the processor data bus 540 into registers within the processor 510 (not shown).

Conversely, as the processor 510 writes data to the storage device 520 the data passes from the processor 510 along the processor data bus 540 to the byte swapping device 530. The byte swapping device 530 receives the data from the processor data bus 540 and selectively byte swaps the data. The byte swapping device 530 then provides the data to the storage device 520 on the system data bus 550. The storage device 520 receives the data from the system data bus 550 into storage locations within the storage device 520 (not shown).

The processor 510 provides the address of the data to be read from or written to the storage device 520 on the processor address bus 560. The processor 510 also provides the necessary control signals on the control bus 570 to instruct the storage device 520 as to how many bytes of data are to be transferred, the direction of the transfer, on which byte lanes the data is to be transferred, etc. The storage device 520 uses the address supplied on the processor address bus 560 and the control signals supplied on the control bus 570 to determine which data to provide or receive. At least some of the data stored in the storage device 520 is little-endian format data and is byte swapped into big-endian format by the byte swapping device 530 to be provided to the processor 510 when the processor 510 reads the data from the storage device 520. Conversely, at least some of the data written by the processor 510 is in big-endian format and is byte swapped by the byte swapping device 530 into little-endian format to be provided to the storage device 520 when the processor 510 writes the data to the storage device 520.

In the preferred embodiment of the present invention the byte swapping device 530 selectively performs byte swapping of the data transferred between the processor 510 and the storage device 520 based upon the address signals provided on the processor address bus 560 and the control signals provided on the control bus 570 by the processor 510.

The byte swapping device 530 receives the address signals from the processor address bus 560 and selectively performs byte swapping based upon whether or not the address on the address signals falls within one or more data conversion apertures, i.e., ranges of contiguous byte addresses on the processor address bus 560. Thus the byte swapping device 530 advantageously provides a hardware mechanism for performing byte swapping in the system 500.

In one embodiment, the one or more data conversion apertures are fixed within the byte swapping device 530. In one embodiment in which the data conversion apertures are fixed, the byte swapping device 530 examines the most significant bits of the address to determine whether or not to swap the data bytes. In another embodiment, the one or more data conversion apertures are programmable by the processor 510.

Alternate Embodiment

Figure 6:
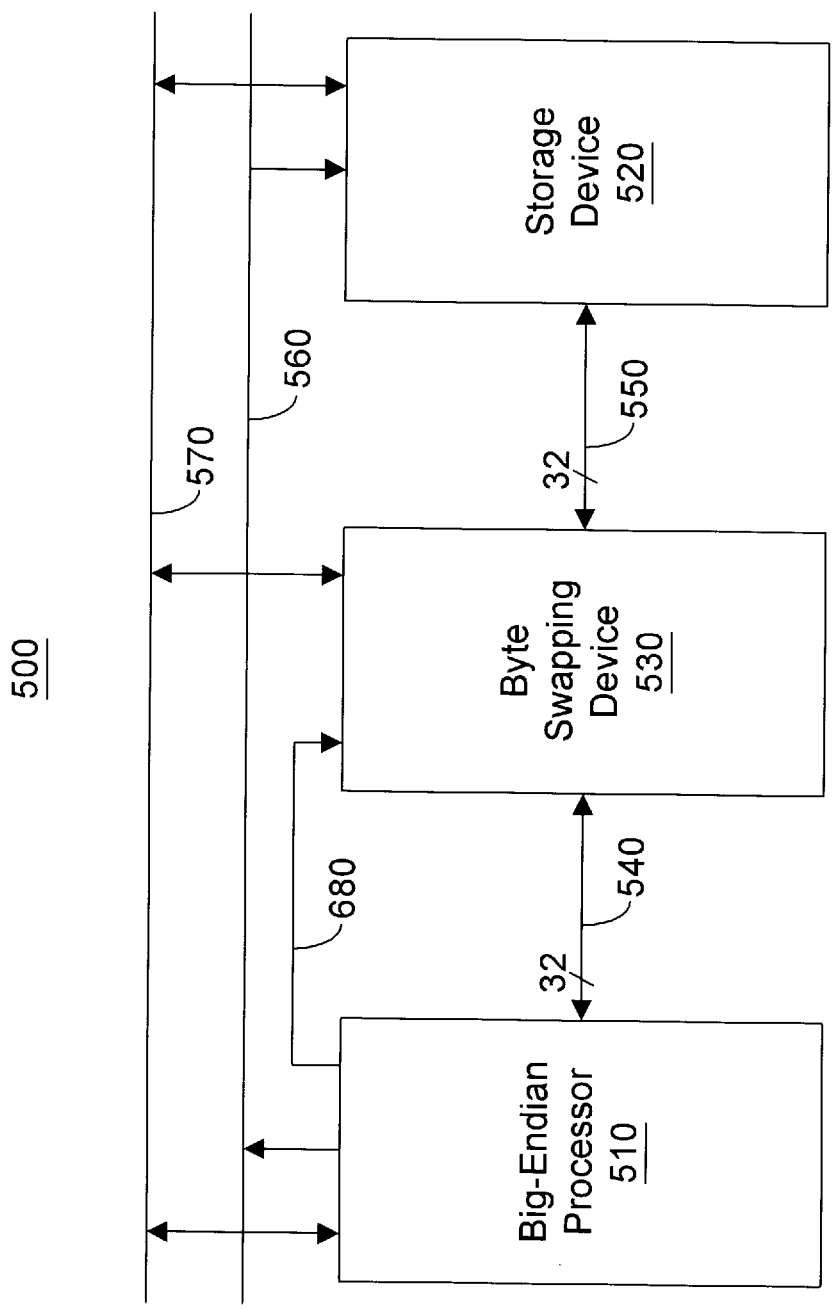
FIG. 6 shows components of a computer system employing a byte swapping device according to an alternate embodiment of the present invention.

Referring now to FIG. 6, a computer system 500 employing a byte swapping device according to an alternate embodiment of the present invention is shown. The system 500 is similar to the system 500 of FIG. 5 and corresponding elements are numbered identically for clarity. The alternate embodiment further comprises byte swap control signals 680 provided by the processor 510 to the byte swapping device 530. The byte swapping device 530 selectively performs byte swapping of the data transferred between the processor 510 and the storage device 520 based upon the byte swap control signals 680 provided to the byte swapping device 530 by the processor 510.

The processor 510 is configured to execute a characteristic instruction set. The instruction set includes instructions to perform transfers of data between the processor 510 and other elements of the system 500, such as the storage device 520 and to perform byte swapping on the data being transferred. The processor generates the byte swap control signals 680 based upon the given instruction being executed by the processor 510. If the processor 510 executes a byte swapping data transfer instruction the processor 510 generates control signals 680 to instruct the byte swapping device 530 to swap the data bytes as they pass through the byte swapping device 530. If the processor 510 executes a non-byte swapping instruction the processor 510 generates control signals 680 to instruct the byte swapping device 530 not to swap the data bytes as they pass through the byte swapping device 530.

It is noted that although embodiments are described which operate on one, two and four byte data types, the invention contemplates embodiments which operate on data types of other sizes, in particular larger data types such as eight byte data types which are common in currently existing processors.

It is further noted that although embodiments are described in which the data processing device is a big-endian format device and the data storage device is a little-endian format device, an embodiment is contemplated in which the two devices have reversed endian formats.

It is further noted that although the embodiments are described with a single processor, alternate embodiments are contemplated which comprise multiple processors.

It is further noted that although embodiments are described in reference to computer systems, the invention contemplates embodiments in other digital systems which store data in both big-endian and little-endian formats.

The Byte Swapping Device

Figure 7:
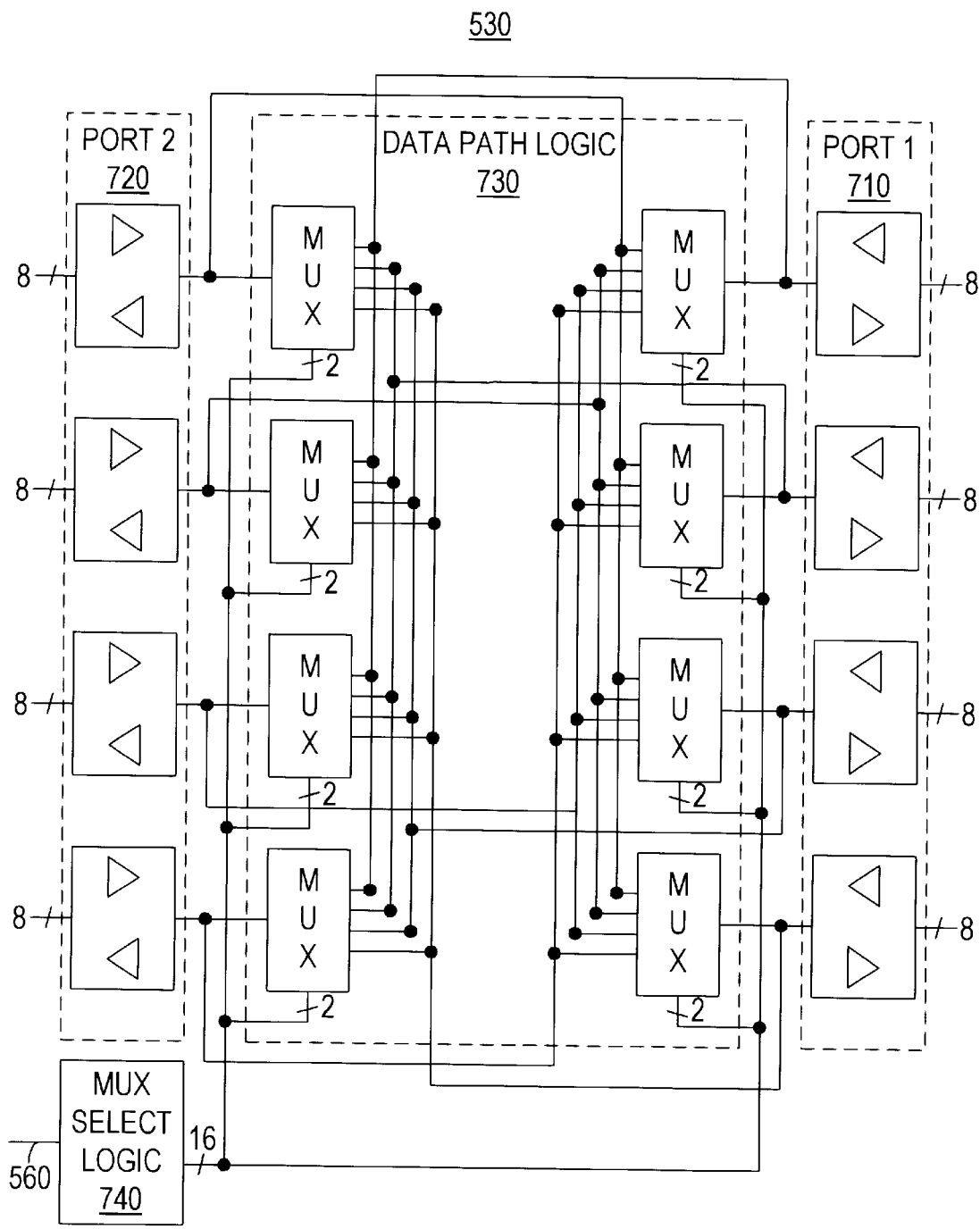
FIG. 7 is a block diagram of the byte swapping device of FIG. 5.

Referring now to FIG. 7, a block diagram of the byte swapping device 530 of FIG. 5 according to the preferred embodiment of the present invention is shown. The byte swapping device 530 comprises a first data port 710 coupled to the storage device 520 (of FIG. 5) and a second data port 720 coupled to the processor 510 (of FIG. 5). Data path logic 730 is coupled between the first data port 710 and second data port 720.

The data ports comprise four byte-wide bi-directional bus transceivers. The data path logic 730 comprises two sets of 4 byte to 1 byte multiplexers. Each multiplexer output of the first set of multiplexers is coupled to a respective transceiver of the second data port 720. Each multiplexer output of the second set of multiplexers is coupled to a respective transceiver of the first data port 710. The four inputs of each of the first set of multiplexers is coupled to a respective bus transceiver of the second data port 720. The four inputs of each of the second set of multiplexers is coupled to a respective bus transceiver of the first data port 710. The multiplexer select signals are provided by multiplexer select logic 740. The transceivers receive the read/write signal (not shown) from the control bus 570 to determine the direction of data flow through the transceivers.

The first data port 710 receives data from and provides data to the storage device 520. The second data port 720 receives data from and provides data to the processor 510. Each of the transceivers of the first data port 710 provides data to the second set of multiplexers of the data path logic 730. Each of the transceivers of the second data port 720 provides data to the first set of multiplexers of the data path logic 730. The multiplexers select one of the four bytes of data received based upon the multiplexer select signals provided by the multiplexer select logic 740. Thus the byte swapping device 530 advantageously provides a hardware mechanism for performing byte swapping.

The byte swapping device 530 of FIG. 7 is configured to perform byte swapping on half-words (i.e., two byte data entities) and words (i.e., four byte data entities). Other embodiments are contemplated which are configured to perform byte swapping on eight, sixteen and larger power of two byte entities.

In the preferred embodiment of the byte swapping device 530 the multiplexer select logic 740 receives the address signals from the processor address bus 560 and uses the address signals to generate the multiplexer select signals. The byte swapping device 530 selectively performs byte swapping on the data passing through the byte swapping device 530 by comparing the address on the address signals with the one or more data conversion apertures as described in the description of FIG. 5.

Alternatively, the byte swapping device 530 further comprises a plurality of aperture storage elements (not shown) which store the one or more data conversion aperture values. The aperture storage elements are coupled to the multiplexer select logic 740 and provide the multiplexer select logic 740 with the one or more data conversion aperture values. The processor 510 programs the aperture storage elements with the desired data conversion aperture values.

Figure 8:
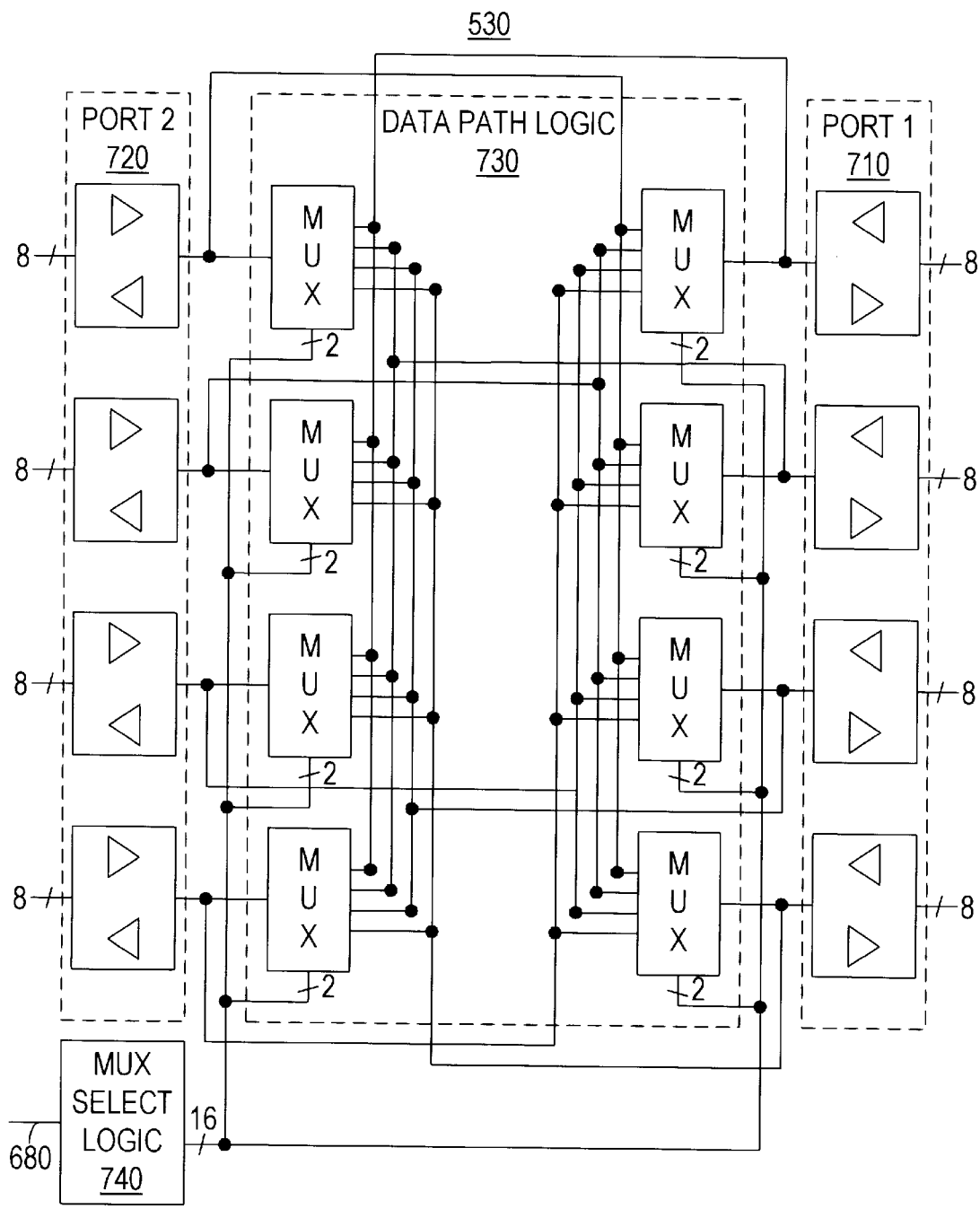
FIG. 8 is a block diagram of the byte swapping device of FIG. 6.

Referring now to FIG. 8, a block diagram of the byte swapping device 530 of FIG. 6 according to the alternate embodiment of the present invention is shown. The byte swapping device 530 is similar to the byte swapping device 530 of FIG. 7, except that the multiplexer select logic 740 receives the byte swap control signals 680 and uses the byte swap control signals 680 to generate the multiplexer select signals.

Source Code Translator

The present invention contemplates a source code translator, or compiler, which translates source code modules written in a high level language, such as the C language, Pascal, Ada, or other languages, into one or more object modules. The object modules are then linked together into an executable computer program to be executed on the computer system 500. The compiler is similar to high-level language compilers known in the art of compilers. However, the compiler of the present invention further comprises a feature for generating code which advantageously employs the byte swapping capability of the computer system 500. The compiler is cognizant of the data conversion apertures of the computer system 500.

The compiler receives the string of characters comprising the source code module and parses the characters into tokens. At least a portion of the tokens are execution statements defined by the high-level language and identifiers associated with data elements. The compiler generates instructions chosen from the instruction set of the processor 510 to perform the execution statements.

The compiler also generates an object offset for each of the data elements so that the instructions may correctly access the data elements. The value of the object offset for a given data element depends upon several factors. One factor is whether the compiler is generating relocatable code or absolute code. Another factor is whether or not the compiler is generating code for a processor which uses base registers. Another factor is the nature of the data element, particularly whether static or dynamic storage allocation is being performed. For example, if the data element is allocated on stack, the object offset will be relative to a stack pointer. The generation of object offsets for data elements is well known in the art of compilers.

The compiler also advantageously generates a format base for each data element. The compiler examines the data type of each data element and decides whether or not transfers of the data element between the processor 510 and the storage device 520 require byte swapping by the byte swapping device 530. If the data element requires byte swapping, such as an integer, short integer, long integer, or floating-point number, the compiler generates a format base to effect byte swapping. If the data element does not require byte swapping, such as a single character within a string, the compiler generates a format base to not effect byte swapping. The format base is added to the object offset to calculate a data aperture offset for each data element as shown below.

$$\text{data aperture offset} = \text{object offset} + \text{format base}$$

A typical compiler stores the object offset associated with each data element in the object code module so that a linker may use the object offset to generate executable code and a loader may load the executable code into a system memory for execution on the computer system 500. However, the compiler of the present invention stores the data aperture offset in the object code module instead of the object offset for each data element. Hence, the object module advantageously contains address offsets for data elements which are aware of the data conversion apertures of the system 500 previously described.

The object module is linked into an executable program. The executable program is loaded into the computer system 500 and executed. Each data element has a base memory address bound by the system in the storage device 520, typically in system memory or registers or shared memory of a peripheral device. The binding of the base memory address to the data element is achieved in one of at least three ways.

In the first scenario, the storage space for the data element is dynamically allocated to the executable program by an operating system running on the computer system at the request of the program. In this case the operating system keeps track of free areas of system memory and allocates a portion of the free system memory to the program to store the data element. The operating system returns the base memory address of the allocated memory to the program, which the program uses to access the data element. Hence, the base memory address is bound to the data element during the execution, or run-time, of the program.

In the second scenario, the storage space for the data element is allocated to the data element by the loader when the program is loaded. The base address of the storage space is communicated to the program by the loader. Hence, the base memory address is bound to the data element during the loading, or load-time, of the program.

In the third scenario, the program, and thus data elements, are loaded at a fixed locations in the system memory as determined by the linker when creating the executable program. Hence, the base memory address is bound to the data element during the linking, or compile-time, of the program.

The format base selectively effects byte swapping as follows. As the program executes the processor 510 executes instructions which perform transfers of the data elements between the processor 510 and the storage device 520. The processor 510 computes the addresses of the data elements, referred to in this disclosure as data aperture addresses, for each element by adding the base memory address for the data element and the data aperture offset as shown in the following equation.

$$\text{data aperture address} = \text{base memory address} + \text{data aperture offset}$$

The processor 510 generates the data aperture address of a given data element on the processor address bus 560 to read or write the data element. The byte swapping device 530 receives the data aperture address from the address bus 560 and selectively byte swaps the data element as the data element is read from the storage device 520 to the processor 510 or written from the processor 510 to the storage device 520 based upon the relationship between the value of the data aperture address received and the data conversion apertures defined for the byte swapping device 530 as discussed in relation to FIG. 5.

In the preferred embodiment, the format bases are chosen such that different format bases are distinguished by using the most significant bits of the address. The number of significant bits used is the ceiling function of the base two logarithm of the number of required data conversion apertures as shown in the following equation.

$$\text{Number of address bits} = \text{ceiling}[\log_2(\text{number of data conversion apertures})]$$

Hence, an implementation requiring 5 data conversion apertures requires 3 bits of address.

In one embodiment of the compiler, the compiler generates a list of data conversion aperture values which are stored in the object module and subsequent executable program. The loader executing on the processor 510 programs the data conversion apertures in the aperture storage elements of the byte swapping device 530 before executing the program.

Conclusion

Therefore, the present invention comprises a byte swapping device employed within a computer system for automatically converting data between big-endian and little-endian formats for the various elements of the computer system. The invention comprises a compiler which advantageously generates object code modules to be linked into executable programs for execution on the computer system employing the byte swapping apparatus.

Although the system, method and apparatus of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for translating a source code module into an object code module, comprising:

choosing a format base for a data element referenced in said source code module;

generating an object offset for said data element;

calculating a data aperture offset of said data element by adding said format base and said object offset;

storing said data aperture offset associated with said data element in said object code module to thereby allow said data aperture offset to be subsequently added to a base memory address;

wherein said choosing a format base, said generating an object offset said calculating a data aperture offset, and said associating said data aperture offset being performed for each data element in said source code module.

2. The method of claim 1, wherein said data element has an associated data type, wherein said choosing said format base is according to said data type of said data element.

3. The method of claim 1, wherein said object code module is linked into an executable computer program for execution on a computer system comprising, wherein said computer system comprises a data storage device configured to store said data elements, a data processing device which controls transfers of said data elements between said data storage device and said data processing device, and a byte swapping device coupled between said data processing device and said storage device, wherein said byte swapping device selectively byte swaps said data elements during said transfers of said data elements between said data storage device and said data processing device, wherein said format base is chosen to cause said byte swapping device to byte swap at least a portion of said data elements during said transfers of said data elements.

4. The method of claim 3, wherein said data element has an associated data type, wherein said choosing said format base is according to said data type of said data element.

5. The method of claim 1, wherein said data element is a field of a data structure, wherein said field of said data structure has a characteristic byte offset within said data structure, wherein said calculating said data aperture offset of said data element comprises:

adding said characteristic byte offset of said field within said data structure, said format base and said object offset.

6. A method for executing a computer program on a computer system, wherein said computer program comprises references to one or more data elements, wherein each of said one or more data elements has an associated data aperture offset stored in said computer program, wherein said computer system comprises a data storage device configured to store said one or more data elements, a data processing device which controls transfers of said one or more data elements between said data storage device and said data processing device, and a byte swapping device coupled between said data processing device and said storage device, wherein said byte swapping device selectively byte swaps said one or more data elements during said transfers of said one or more data elements between said data storage device and said data processing device according to a plurality of data conversion apertures, comprising:

binding a base memory address to a data element of said one or more data elements referenced by said computer program and stored in said computer system, wherein said base memory address is subsequently used, along with a data aperture offset associated with said data element and stored in said computer program, in calculating a data aperture address for said data element;

computing a data aperture address for said data element by adding said base memory address of said data element and the stored associated data aperture offset of said data element;

transferring said data element between said data processing device and said data storage device, wherein said data processing device generates said data aperture address to perform said transferring of said data element;

selectively byte swapping said data element during said transferring of said data element between said data processing device and said data storage device according to a relationship between said data aperture address and sad plurality of said data conversion apertures;

wherein said binding, said computing, said transferring and said selectively byte swapping are performed for each transfer of said one or more data elements between said data processing device and said data storage device.

7. The method of claim 6, wherein said binding said base memory address to said data element is performed at runtime of said computer program.

8. The method of claim 6, wherein said binding said base memory address to said data element is performed at load-time of said computer program.

9. The method of claim 6, wherein said binding said base memory address to said data element is performed at compile-time of said computer program.

10. The method of claim 6, wherein said byte swapping device further comprises one or more aperture storage elements configured to store respective said plurality of data conversion apertures.

11. The method of claim 10, wherein said data processing device writes said plurality of data conversion apertures to said one or more aperture storage elements.

12. The method of claim 6, wherein said data processing device is configured to generate data aperture addresses within a characteristic memory space, wherein said plurality of data conversion apertures comprise distinct apertures of said memory space.

13. The method of claim 6, wherein said data conversion apertures comprise a single-byte data element aperture and one or more multiple-byte data element apertures, wherein said byte swapping device byte swaps said data elements during said transferring of said data element between said data processing device and said data storage device only when said transferring occurs in said one or more multiple-byte data element apertures.

14. The method of claim 6, wherein said data conversion apertures comprise one or more byte-swapping data element apertures and one or more non-byte-swapping data element apertures, wherein said byte swapping device byte swaps said data elements during said transferring of said data element between said data processing device and said data storage device only when said transferring occurs in said one or more byte-swapping data element apertures.

* * * * *

UNITED STATES PATENT AND TRADEMARK OFFICE
CERTIFICATE OF CORRECTION

PATENT NO. : 5,828,884

DATED : October 27,1998

INVENTOR(S) :
Sherman Lee and JoAnne K. Halligan

It is certified that error appears in the above-identified patent and that said Letters Patent is hereby corrected as shown below:

In the Claims:

Claim 6, col. 12, line 12, please delete "sad" and replace with --said --.

Signed and Sealed this

Thirteenth Day of July, 1999

Attest:

Q. TODD DICKINSON

Attesting Officer

Acting Commissioner of Patents and Trademarks